United States Patent [19]
Sutton

[11] 3,979,217
[45] Sept. 7, 1976

[54] LIGHTWEIGHT CELLULAR CEMENT COMPOSITIONS AND METHODS OF CASTING THE SAME

[75] Inventor: David L. Sutton, Duncan, Okla.

[73] Assignee: Halliburton Company, Duncan, Okla.

[22] Filed: May 5, 1975

[21] Appl. No.: 574,226

Related U.S. Application Data

[63] Continuation of Ser. No. 365,918, June 1, 1973, abandoned.

[52] U.S. Cl. .................................... 106/88; 106/90
[51] Int. Cl.² ......................................... C04B 21/00
[58] Field of Search ............... 106/86, 87, 88, 90; 264/101

[56] References Cited
UNITED STATES PATENTS

| | | | |
|---|---|---|---|
| 2,046,867 | 7/1936 | Billner | 264/101 |
| 2,167,200 | 7/1939 | Dahlberg | 264/101 |
| 3,506,747 | 4/1970 | Creskoff | 264/101 |
| 3,679,445 | 7/1972 | Howe | 106/88 |
| 3,729,328 | 4/1973 | Magder | 106/90 |
| 3,758,319 | 9/1973 | Ergene | 106/88 |
| 3,782,983 | 1/1974 | Komor | 106/88 |

*Primary Examiner*—J. Poer
*Attorney, Agent, or Firm*—Robert S. Nisbett; Thomas R. Weaver; John H. Tregoning

[57] ABSTRACT

The present invention relates to novel lightweight cellular cement compositions, methods of preparing such compositions and methods of casting the compositions into lightweight high strength structural members.

2 Claims, 6 Drawing Figures

LIGHTWEIGHT CELLULAR CEMENT COMPOSITIONS AND METHODS OF CASTING THE SAME

This is a continuation of application Ser. No. 365,918, filed June 1, 1973, now abandoned.

Lightweight cellular or foamed cement compositions having densities below about 80 pounds per cubic foot have been developed and used heretofore. Generally, however, such compositions require special and expensive equipment or they include relatively expensive blowing agents, i.e., gas generating chemicals, to produce the desired cellular consistency.

In one aspect of the present invention, novel foamed or cellular cement compositions and methods of preparing such compositions are provided. The cellular cement compositions of the present invention include entrained air and are economically prepared using conventional mixing apparatus.

In another aspect, the present invention relates to methods of casting cement compositions into structural members. That is, methods are provided for casting cellular cement compositions into lightweight structural members particularly useful as wall, floor and roof panels in building structures.

While precast concrete structural panels have been developed and used heretofore, the high weight of such panels has been a problems. Weight reduction of concrete structural panels have been accomplished to some degree by using lightweight aggregate. In addition, the entrainment of air in the concrete has been used with some success. However, air entrainment severely reduces the strength of conventional concrete structural panels. For example, air entrainment in the concrete in an amount of 10 percent by volume reduces the weight of the resulting set concrete from about 9 to 11 pounds per cubic foot, but also reduces the strength of the concrete from 30 to 50 percent.

Another procedure used heretofore for reducing the weight of concrete structural panels is the formation of the panels in layers. Such composite panels include a low strength lightweight internal core and a high strength, high density outer layer. This type of composite unit provides good overall weight reduction and retains high strength in the outer layer which contributes the greatest to overall strength. In addition, such units provide improved water tightness, wear durability and sound and heat insulation as compared to structural panels formed of homogeneous concrete. A major drawback to such composite structural panels has been the high costs associated with their production. This high cost is due to separate mold fill operations being required in order to produce the various layers and the increase in time required from filling the mold to producing the resultant set product, By the present invention a method of casting a lightweight cellular cement composition into an integral structural member having a high strength densified shell surrounding or adjacent to a lightweight cellular core is provided which is inexpensive to carry out as compared to heretofore utilized methods of forming similar structural members.

The lightweight cellular cement compositions of the present invention are broadly comprised of hydraulic cement, water, a foam stabilizer and air entrained in the cement-water-foam stabilizer mixture in an amount sufficient to lower the density thereof to a desired level.

In using the lightweight cellular cement compositions to form structural members, i.e., structural panels having integral high strength densified shells surrounding or adjacent to lightweight cellular cores, a composition according to this invention is introduced into a mold having at least one wall formed of an air and water permeable material. A pressure differential is established across the permeable wall or walls so that at least a portion of the air and water contained in the cement composition is caused to flow through the permeable wall or walls of the mold to thereby form a densified layer of cement composition within the mold adjacent the permeable wall or walls. That is, cement nearer the permeable wall or walls is more dense than cement further removed from the wall or walls. The structural member which results after the cement composition is allowed to harden is a lightweight panel of high strength having all of the advantages of heretofore used composite type panels described above as well as the advantage of being relatively inexpensive to produce.

In the drawings forming a part of this disclosure,

Figure 1:
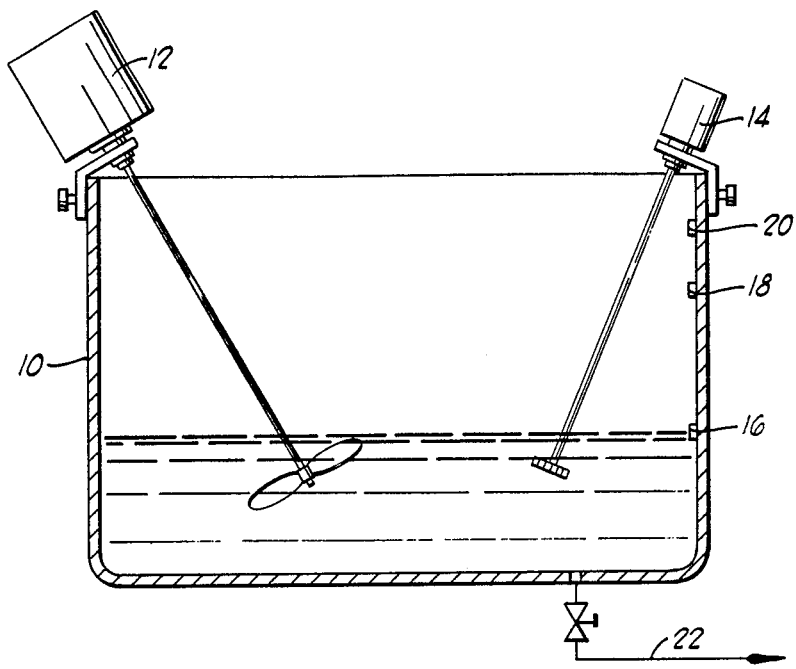
FIG. 1 is a partly sectional-partly diagrammatic view of a mixing apparatus which can be used for preparing the lightweight cellular cement compositions of the present invention.

A preferred lightweight cementious composition of the present invention having a density of not more than about 80 pounds per cubic foot is a cellular cement composition formed of a hydraulic inorganic cement, water present in an amount in the range of from about 23 percent to about 80 percent by weight of dry cement, a foam stabilizer present in an amount in the range of from about 0.25 percent to 5 percent by weight of dry cement, and air entrained in the cement composition in an amount sufficient to lower the density thereof to the desired level. As will be described further hereinbelow, other components can be used in the lightweight cement composition to impart desired properties thereto. For example, if the cellular cement composition is to be utilized in operations carried out in subterranean well formations and the like, fluid loss control additives, set time modifiers, viscosity control additives and the like may be included in the composition. In addition, a variety of other components can be used in the composition depending upon the ultimate use to which the composition is put, such as lightweight aggregate, e.g., glass or ceramic cellular spheres, natural or synthetic fibers, metal fibers, fine aggregate and other materials.

Any of a variety of hydraulic cements such as Portland cement, gypsum cement of high alumina cement can be used. Portland cement is generally preferred because of its low cost and good availability.

The water use in the cement composition can be fresh water from any source, except that the water should not contain organic compounds or salts which may affect the foam stability of the cement composition. Calcium salts such as calcium chloride have been found to adversely affect the stability of most foaming agents used in the cement composition, and carbonates cause unpredictable flash setting of the cement composition. However, the water can usually contain salts such as sodium chloride or potassium chloride in amounts up to about 10 percent by weight without adversely affecting the properties of the cement composition.

The particular quantity of water which should be used in the cement composition varies with the quantity and type of foam stabilizers, dispersants and aggregates used. For example, when the cement composition includes an inorganic foam stabilizer which does not affect the consistency of the cement composition to a great degree, a dispersant present in an amount of 1 percent by weight of dry cement or less and no aggregate, a water concentration of about 30 percent by weight of the dry cement is used. When the cement composition includes relatively large quantities of aggregate, no dispersant and a foam stabilizer which changes the consistency of the cement composition, a water concentration of about 70 percent by weight of dry cement is used. Generally, water should be present in the cement composition in the range of from about 23 percent to about 80 percent by weight of dry cement used. Water concentrations of less than about 23 percent by weight of cement results in mixing difficulties even where large quantities of dispersants are used, and generally large quantities of foam stabilizers to entrain the required quantity of air are required. Water concentrations higher than about 80 percent by weight reduces the strength of the set cement due to excessive water being present. A cellular cement composition formed of Portland cement, having no dispersants therein and having water present therein in an amount of about 40 percent by weight of dry cement is preferred.

While a variety of foam stabilizers can be utilized in the cement compositions of the present invention, two types have been found to be particularly suitable. These are organic surface active agent foam stabilizers and inorganic particulate lamellar foam stabilizers. Examples of useful organic surfactant foam stabilizers are commercially available alkylnaphthalene sodium sulfonate compounds, ammonium salts of sulfonated linear primary ethoxylated alcohols and dodecyl diphenyl-ether disulfonic acid. Other useful commercially available organic surfactant foam stabilizers are those having the betaine type structure. Of these, a 32 percent active solution of the sodium salt of coco amido propyl dimethyl carboxyethyl ammonium chloride is an isopropanol-water solent is particularly useful.

Examples of useful inorganic laminated particle foam stabilizers are betonite, talc, asbestos fines, synthetic clays, pulverized vermiculite, graphite and mica. Of these, the most preferred is bentonite because of its low cost and high yield, i.e., high contribution to the consistency of the resulting cement composition. Mixtures of the organic and inorganic foam stabilizers mentioned above also provides good results. Generally, the foam stabilizer or mixture of stabilizers used should be present in the cement composition in an amount in the range of from about 0.25 percent to about 5 percent by weight of dry cement used. When one or more organic surfactant foam stabilizers are used, a concentration in the range of from about 0.25 percent to about 2.5 percent by weight of cement is preferred, and when one or more inorganic particulate lamellar foam stabilizers are used, a concentration in the range of from about 0.25 percent to about 5 percent by weight of cement is preferred. A preferred mixture of inorganic and organic foam stabilizers is 1 percent bentonite, 0.87 percent of a commercially available alkylnaphthalene sodium sulfonate compound and 0.87 percent of dodecyl diphenyl-ether disulfonic acid, all based on the weight of dry cement used.

Dispersing agents can be utilized in the cement composition to facilitate using lower quantities of water and promote higher set cement strength. Also, the use of dispersing agents in the cement composition can prevent premature development of thixotropic properties and promote easier movement of the unset composition. The dispersing agents can be added to the cement composition in an amount up to about 2.0 percent by weight of dry cement. Examples of dispersing agents which have been found to be particularly suitable are commercially available sodium salts of condensed mono-naphthalene sulfonic acids. A method of preparing one such dispersant which includes polyvinyl-pyrolidone is described in U.S. Pat. No. 3,359,225. Other dispersants which also function as retarders may be used, e.g., lignosulfonates.

Set time modifiers, i.e., set time retarders or accelerators can be added to the cement composition to control the set time in accordance with particualr placement time required. Accelerators such as the soluble inorganic salts can be utilized up to about 10 percent by weight of dry cement; and retarders, either organic or inorganic in nature, can be used up to about 2 percent by weight of dry cement.

Fine aggregate or filler materials, such as fly ash, silica flour, fine sand, diatomaceous earth and lightweight aggregate fines can be used in the cement composition as long as they do not bring about foam breakout or result in strength reductions. In addition, fibers or whiskers can be used in the cement composition to provide strength to the composition after it has set. The fibers can be formed of metal, glass or other synthetic materials which are insoluble in water and which will not deteriorate in alkaline environments when cements other than gypsum cement are used. The fibers must be fine enough not to excessively settle or float in the cement composition and must have a length to diameter ratio low enough to prevent matting or entanglement. Examples of synthetic fibers which are particularly suitable for use in the cement composition are those formed of nylon (polyamides) and polyacylonitrile. The fibers can be up to about 4 inches in length and preferably in the range of from about 0.1 inches to about 4 inches long so that the length is at least three times the diameter of the largest air pore expected to occur in the cement composition or the largest aggregate which is used in the composition. However, the preferred length of fiber is in the range from about ⅜ inches to about 1 ½ inches. The most preferred fibers for use in the cement composition utilized in accordance with the present invention are those formed of nylon having a diameter in the range of from about 0.001 inches to about 0.2 inches and a length in the range of from about 3/8 to 1 ½ inches. The fibers are preferably present in the cement composition in the range of from about 1/64 pound of fibers per cubic foot of cement slurry to about ¾ pound of fibers per cubic foot of slurry. The most preferred fiber concentration is in the range of from about 1/16 to about ¼ pound of fibers per cubic foot of cement composition.

Lightweight cellular sphere type aggregate when utilized in the cement compositions of this invention provides particularly suitable characteristics to the compositions for forming structural panels and the like. The cellular spheres can be formed of inorganic glass or ceramic material, but must include a high percentage of sealed cells. Sizes passing a 4 mesh sieve (U.S. Sieve Series) and retained on a 100 mesh sieve can be used. The most preferred size of spheres for use in the cement compositions is that which passes a 10 mesh sieve and is retained on a 30 mesh sieve. The bulk density of the spheres can range from 15 to 40 pounds per cubic foot with the preferred density being 25 pounds per cubic foot. The bulk volume of spheres can range from about 2 to about 5 times the volume of unfoamed cement slurry utilized. When cellular spheres are utilized in the cement composition, a foam stabilizer which also functions as a dispersant is preferably used, e.g., an ammonium salt of a sulfonated linear primary ethoxylated alcohol. The foam stabilizer is preferably present in the composition in an amount in the range of from about 0.5 percent to about 2.5 percent by weight of dry cement.

A particularly suitable cement composition of the present invention which includes lightweight cellular sphere aggregate is comprised of hydraulic cement; water present in the range of from about 23 percent to about 80 percent by weight of dry cement; a foam stabilizer present in an amount in the range of from about 0.5 percent to about 2.5 percent by weight of dry cement; lightweight cellular sphere aggregate present in a volume in the range of from about 2 to about 5 times the volume of unfoamed cement, water and for stabilizer used; and air entrained in the cement composition in an amount sufficient to lower the density thereof to a level below about 80 pounds per cubic foot.

Other additives which are known and used by those skilled in the art can be combined with the lightweight cement compositions of the present invention so long as the density of the cement compositions remains at a desired level, generally below about 80 pounds per cubic foot, and preferably 50 pounds per cubic foot.

The cellular cement compositions of the present invention can be prepared in either conventional batch or continuous mixing apparatus. Referring now to the drawings, and particularly to FIG. 1, the cellular cement composition can be prepared by introducing the water, foam stabilizers and any other water soluble or water dispersible additives used into a mixing tank 10 equipped with a conventional variable speed propeller type mixer 12 and a conventional high speed mixer or homogenizer 14. The mixing tank 10 preferably includes level markers 16, 18 and 20 for indicating predetermined volumes or levels of the various cement composition components before and after foaming. That is, the marker 16 indicates the predetermined volume of water, foam stabilizer and water soluble components required before the mixture is foamed. The marker 18 indicates the predetermined volume of the mixture after foaming, and the marker 20 indicates the level of the final composition after addition of the dry cement and other dry materials to the foamed mixture.

After introduction of the water and water-soluble components into the mixing tank 10 to produce a volume having a level at the marker 16, the low speed mixer 12 is operated to agitate the mixture and introduce air therein. The high speed mixer or homogenizer 14 is simultaneously operated to stabilize the foam and form a finely foamed mixture. The mixing and introduction of air is contained until a predetermined volume of foam is produced, i.e., a volume such that the level of foam is at the marker 18.

The dry cement and other dry additives utilized such as fibers, aggregates, dispersing agents, set time modifiers, etc., are next introduced into the container 10 and mixed with the foam by the combined action of the high speed mixer 14 (run at reduced speed) and the low speed prop mixer 12. The mixer is continued until a measure of overall agitation is given to the entire batch of cement composition and the composition attains a predetermined volume, i.e., a level in the container 10 at the marker 20. The density of the cement composition is controlled by foaming the liquid before adding the dry material to a predetermined volume indicated by the marker 18. This volume is determined by considering the absolute volume of the dry materials, the amount of air breakout caused by adding the dry materials to the foam (determined by previous experience) and the desired cement composition density. The final cement composition is a smooth and stable mixture which is withdrawn from the mixing tank 10 by way of a conduit 22 connected thereto.

Figure 2:
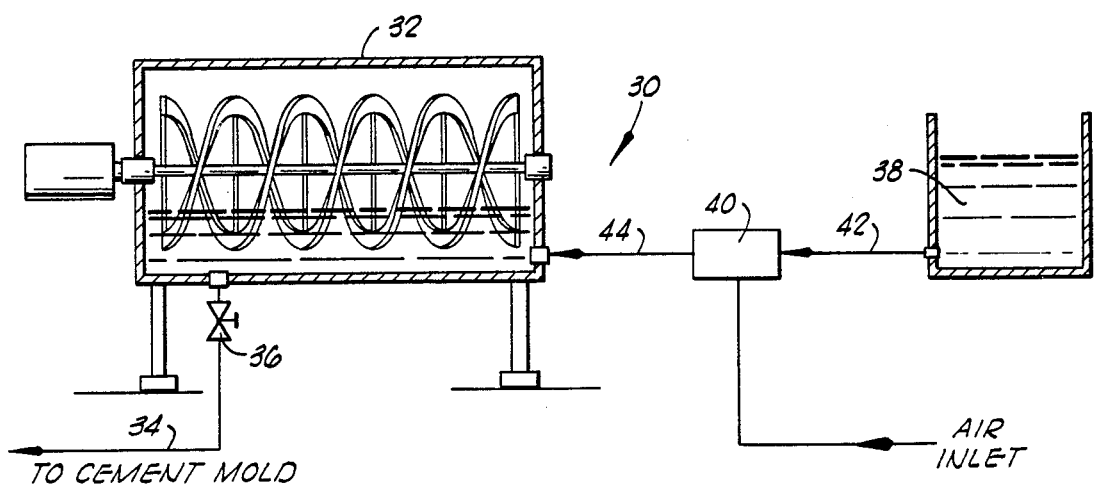
FIG. 2 is a partly sectional-partly diagrammatic view of an alternate system of mixing apparatus which can be used to prepare the cement composition.

Referring now to FIG. 2, an alternate system of apparatus generally designated by the numeral 30 which can be used for preparing the lightweight cement composition of the present invention is illustrated. The system 30 is comprised of a conventional ribbon blender apparatus 32 having a withdrawal conduit 34 and shutoff valve 36 connected thereto. A container 38 is provided which is connected to a conventional foam generator apparatus 40 by a conduit 42. The foam generator 40 is in turn connected to the ribbon blender 32 by a conduit 44. In use of the system 30 for preparing a lightweight cement composition of the present invention, about ⅔ of the water, the dry cement and other dry materials used are introduced into the ribbon blender 32 and mixed to form an unfoamed slurry. The remaining ⅓ of the water is placed in the container 38 along with the foam stabilizers used. The foam generator 40 is operated so that the water and foam stabilizers are withdrawn from the container 38 by way of the conduit 42, foamed with air in the foam generator and the resulting foam then injected into the ribbon blender 32 by way of the conduit 44. Foam injection is continued while operating the ribbon blender 32 until all the water is withdrawn from the container 38 or until a predetermined level of foamed cement composition is produced in the blender 32. The final foamed cement composition is withdrawn from the blender 32 by way of the conduit 34 and valve 36.

When lightweight cellular glass or ceramic spheres are utilized in the cement composition, the composition can be mixed in any conventional low speed mixer which will promote air entrainment. Preferably, the total absolute volume of the cement, water and other additives used is less than the free void space of the bulk volume of lightweight aggregate used. By limiting the volumes utilized in this manner, a cement mixture results into which air can be entrained with minimum mixing.

In order to further illustrate the lightweight cellular cement compositions of the present invention and present a clear understanding thereof, the following example is given:

EXAMPLE 1

Various cellular cement compositions are prepared in a system of the type illustrated in FIG. 2 by mixing Portland cement, fibers, fillers, dispersing agents and other materials, in the ribbon blender 32 with approximately ⅔ of the water used to form a slurry thereof. The remaining ⅓ of the water is mixed with the foam stabilizers used in the container 38 and air is injected into the foam stabilizer-water mixture by the foam generator 40. The cement slurry and foam are combined in the blender 32 to form the cellular cement composition. After mixing, each of the cellular cement compositions formed is tested for density using a conventional cement density testing apparatus, and portions thereof are placed in molds which are maintained in a 140°F water bath. Upon curing, the set portions of the cellular cement compositions are removed from the molds and tested for compressive strength in a conventional manner. The results of these tests are shown in Table I below.

meable material. A pressure differential is applied to the wall or walls of the mold so that air and water contained in the cement composition adjacent the wall or walls are caused to flow therethrough. This removal of air and water from the portions of the cement composition adjacent the wall or walls of the mold causes a densified layer or layers of cement composition to be formed adjacent to a layer of lightweight cellular cement composition. The cement composition is then allowed to set into a hard structural member having a high strength densified layer and a lightweight cellular layer.

Referring again to the drawings, and particularly to FIGS. 3 through 6, a mold apparatus or system which can be utilized for carrying out the method of the present invention to form rectangular structural members or panels is illustrated and generally designated by the numeral 45. While the mold apparatus 45 illustrated and described hereinbelow is rectangular and includes six permeable walls, it will be understood by those skilled in the art that the mold apparatus utilized in carrying out the methods of this invention can take a variety of shapes and can include one or more than one wall formed of air and water permeable material.

The apparatus 45 includes an outer enclosure 46

TABLE I

DENSITIES AND COMPRESSIVE STRENGTHS OF VARIOUS CELLULAR CEMENT COMPOSITIONS

| Cement Composition No. | Water Content, % by Weight of Dry Cement | Nylon Fiber Content, Lb/Cubic Foot of Cement Composition | Foaming Agent | Foaming Agent Content, % by Weight of Dry Cement | Density[7] of Composition, Lb/Cubic Foot | 140°F Compressive Strength, psi | |
|---|---|---|---|---|---|---|---|
| | | | | | | After 7 Days | After 14 Days |
| 1 | 60 | 1/12 | A[1] | 1.0 | 51.1 | 509 | — |
| 3 | 60 | 1/12 | A[1] | 1.5 | 47.7 | 353 | — |
| 4 | 60 | 1/12 | A[1] | 2.0 | 51.8 | 242 | — |
| 10 | 60 | 1/6 | A[1] / B[2] | 0.5 / 0.5 | 50.3 | 448 | — |
| 11 | 40 | 1/4 | A[1] / B[2] | 0.5 / 0.5 | 50.2 | 482[4] | — |
| 12 | 40 | 1/3 | A[1] / B[2] | 0.5 / 0.5 | 51.6 | 379 | — |
| 14 | 60 | 0[3] | A[1] / B[2] | 0.13 / 0.25 | 47.2 | 231[5] | — |
| 15 | 50 | 1/12 | A[1] / B[2] | 0.5 / 0.25 | 50.7 | 505 | 551 |
| 16 | 50 | 0 | A[1] / B[2] | 0.5 / 0.5 | 49.8 | 534 | 502 |
| 17 | 70 | 1/12 | A[1] / B[2] | 0.5 / 0.25 | 51.5 | 334 | — |
| 20[6] | | | | | | | |
| 22[6] | | | | | | | |

[1]Foaming agent A is an alkylnaphthalene sodium sulfonate compound sold commercially under the trade designation "PETRO AG" by the Petro Chemical Company.
[2]Foaming agent B is a dodecyl diphenyl-ether disulfonic acid sold commercially under the trade designation "DOWFAX 2AO" by the Dow Chemical Corporation.
[3]Includes 25% by weight of dry cement of a fine expanded lightweight filter in lieu of fibers.
[4]After 4 days instead of 7 days.
[5]After 3 days instead of 7 days.
[6]Includes 40% by weight of dry cement of a pozzolanic material.
[7]Moist cured density.

In using the cellular cement compositions of the present invention for forming lightweight structural members having integral high strength shells surrounding or adjacent to lightweight cellular cores, a cement composition is prepared in the manner described above having a density as low as possible, preferably about 50 pounds per cubic foot or less. The cement composition is injected into a mold for forming the desired size and shape of structural member or panel, which mold includes a wall or walls formed of an air and water per-comprised of end members 48 and 50, sides 52 and 54, a bottom 56 and a top 58, all of which are removably held together in a conventional manner to form a sealed rectangular mold.

Figure 4:
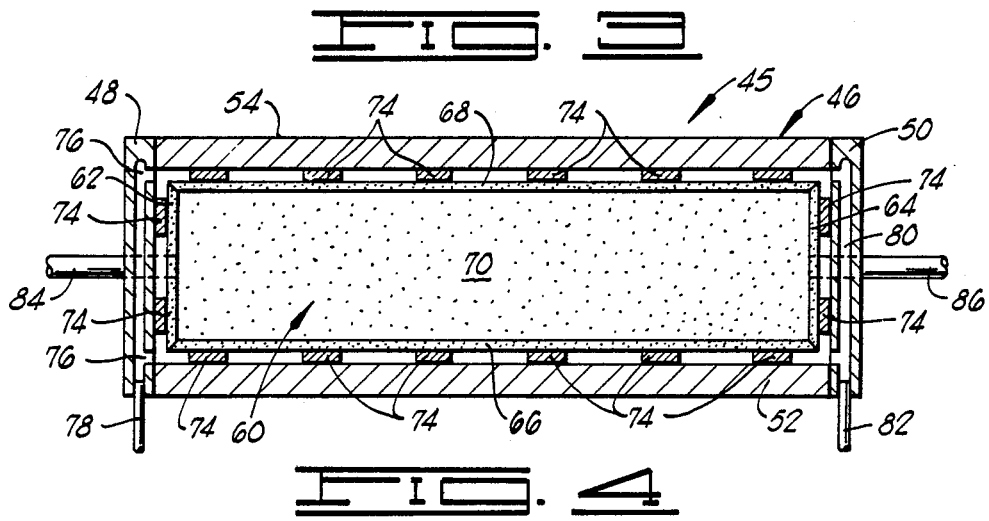
FIG. 4 is a cross-sectional view of the apparatus of FIG. 3 taken along line 4—4 thereof.
Figure 5:
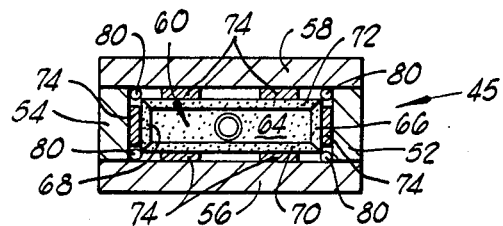
FIG. 5 is a cross-sectional view taken along line 5—5 of FIG. 3.
Figure 6:
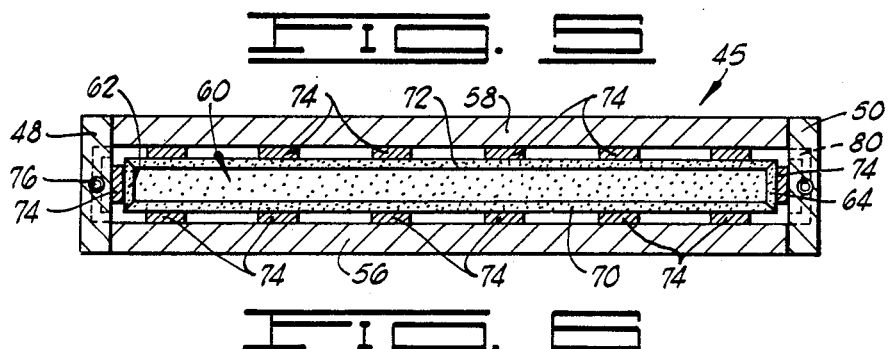
FIG. 6 is a cross-sectional view taken along line 6—6 of FIG. 3.

Referring specifically to FIGS. 4 through 6, the interior of the enclosure 46 includes a second enclosure 60 formed of a porous material such as paper, polyethylene, woven or unwoven fabric, etc. That is, internal walls are disposed in the enclosure 46 forming an air and water permeable mold enclosure 60. The enclosure 60 includes end walls 62 and 64, side walls 66 and 68, a bottom wall 70 and a top wall 72. The permeable walls of the enclosure 60 are spaced apart from the walls of the outer enclosure 46 by a plurality of spacer members 74. As will be readily apparent, the spacer members 74 can take any of a variety of forms. For example, instead of the small spacer blocks 74 illustrated in the drawings, screen wire mesh can be positioned between the porous walls of the mold enclosure 60 and the outer walls of the enclosure 46. The function of the spacer members 74 is to provide a plurality of passages for air and water which flows through the porous walls of the enclosure 60 as will be described further hereinbelow.

The end walls 48 and 50 of the outer enclosure 46 of the apparatus 45 include a plurality of integral passageways formed therein for withdrawing the air and water from within the enclosure 46. That is, the end 48 includes internal passageways 76 which communicate with a conduit 78 connected thereto and the end 50 includes a plurality of passageways 80 which communicate with a conduit 82 attached thereto.

A cement composition inlet conduit 84 is provided extending through the end 48 of the enclosure 46 and through the end 62 of the inner mold enclosure 60. A vent 86 is provided communicating the enclosure 60 with the atmosphere outside the outer enclosure 46 of the apparatus 45.

Figure 3:
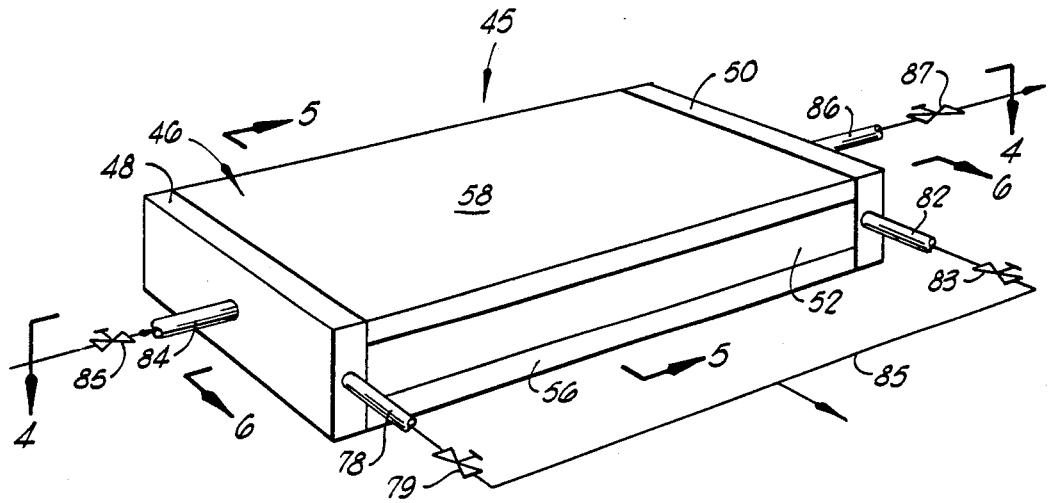
FIG. 3 is a partly diagrammtic perspective view of a mold apparatus which can be for carrying out the method of forming structural members of the present invention.

In carrying out the method of the present invention for casting cement compositions into lightweight high strength structural members, a quantity of a cellular cement composition of the present invention is caused to flow into the mold apparatus 46. Referring particularly To FIG. 3, a stream of cement composition, e.g., a cement composition prepared in the system 30 of FIG. 2, is caused to flow through the conduit 84 into the inner enclosure 60 of the mold apparatus 45. As will be understood by those skilled in the art, the cement composition can be caused to flow into the mold apparatus 45 by gravity or a pump may be utilized. As the stream of cement composition flows into the inner mold enclosure 60, air is vented from the enclosure by way of the vent conduit 86 having a conventional shutoff valve 87 disposed therein. As illustrated in FIG. 3, the conduits 78 and 82 connected to the passageways 76 and 80 of the end walls 48 and 50 respectively can include conventional shutoff valves 79 and 84 disposed therein respectively, and can be connected to a manifold 85 which is in turn connected to a drain.

After the air and water permeable inner enclosure 60 is completely filled with the cellular cement composition, a differential pressure is applied to the cement composition and the enclosure 60. As will be readily perceived, the differential pressure may be applied using a variety of techniques. For example, a super-atmospheric pressure can be maintained on the cement composition within the mold enclosure 60 by the application of water or air pressure to the cement composition by way of the inlet conduit 84, etc. Alternatively, a vacuum or sub-atmospheric pressure can be applied externally of the enclosure 60 by way of the passageways 76 and 80 of the end walls 48 and 50 respectively, the conduits 78 and 82 and the header 85. In addition, both internal super-atmospheric pressure and external sub-atmospheric pressure can be utilized to produce the desired differential pressure.

Upon the application of differential pressure to the cement composition and the porous enclosure 60 of the apparatus 45, air and water contained in the cement composition are forced through the permeable walls of the enclosure 60 and removed from the mold apparatus 46 by way of the conduits 78 and 82, valves 79 and 83 and the manifold 85. The passage of air and water through the permeable walls of the mold is not instantaneous. Thus, formation of the densified layer requires a definite period of time. Accordingly, the differential pressure is applied for a predetermined period of time or until a predetermined volume of air and water are removed from the cement composition so that a densified layer of cement composition adjacent the walls of the enclosure 60 is formed. That is, air and water are caused to be removed from the portions of the cellular cement composition adjacent the walls of the enclosure 60 so that a densified shell of cement composition is formed surrounding an inner core of lightweight cellular cement composition. Once the densified shell is formed, the mold is shut in by closing the various shut-off valves associated therewith and the cement composition allowed to set.

As will be well understood by those skilled in the art, a variety of techniques can be utilized to control the volume of air and water removed so that the cement composition within the mold apparatus 46 obtains the desired characteristics. For example, as mentioned above, the quantity of air and water removed by way of the conduits 78 and 82 attached to the outer enclosure 45 can be controlled to produce a densified layer in the cement composition adjacent the walls of the enclosure 60 of the desired thickness. Another technique which can be employed is to apply a vacuum to the outside of the enclosure 60 by way of the conduits 78 and 82 while maintaining a positive head of cement composition on the inlet conduit 84, and allowing a predetermined additional volume of cement composition to enter the mold enclosure 60 while the vacuum is applied.

Once the densified shell of cement composition is formed around an inner core of lightweight cellular cement composition and the cement composition allowed to harden, an integral high strength structural panel is produced of both high strength and light weight.

While presently preferred mold apparatus for carrying out the method of the present invention of forming structural members has been described for purposes of this disclosure, it will be understood by those skilled in the art that a great variety of differing apparatus arranged in a variety of ways can be utilized for carrying out the method. Further, it will be understood that considerable variations in the relative amounts of the different components of the novel cement composition of the present invention and the methods of preparing such compositions can be made and this invention is not to be limited to the specific examples which are given herein for the purpose of this disclosure.

What is claimed is:
1. A method of producing an integral lightweight high strength cement composition having at least one high strength densified layer adjacent at least on lightweight cellular layer comprising mixing hydraulic cement; water added in an amount of about 23–80% by weight of said dry cement; a foam stabilizer added in an amount 0.25–5% by weight of dry cement selected from organic surfactants, inorganic lamellar particulate and mixtures thereof; a dispersing agent selected and added to facilitate formation of a high strength densi- fied layer prior to setting of said composition; and air added in an amount sufficient to reduce density to less than about 80 pounds per cubic foot; forming said cement composition into the desired shape; positioning an air and water permeable material adjacent the cement composition; promoting and controlling formation of said high strength densified layer by establishing a pressure differential across said permeable material causing air and water to flow from the layer to be densified and allowing said composition to set.

2. A method of claim 1 for producing an integral lightweight high strength cement composition having at least two high strength densified layers adjacent at least one lightweight cellular layer, wherein said cement composition is formed into the desired shape by at least two walls of said air and water permeable material.

* * * * *

UNITED STATES PATENT AND TRADEMARK OFFICE
CERTIFICATE OF CORRECTION

PATENT NO. : 3,979,217
DATED : Sept. 7, 1976
INVENTOR(S) : DAVID L. SUTTON

It is certified that error appears in the above—identified patent and that said Letters Patent are hereby corrected as shown below:

Column 2, line 30, after the word "be" insert the word --used--.

Column 3, line 54, delete the word "is" and insert --in--.

Column 3, line 55, "solent" should read --solvent--.

Column 3, line 63, delete the word "provides" and insert therefor --produces--.

Column 5, line 37, delete the word "for" and insert therefor --foam--.

Column 9, line 47, delete the numeral "84" and insert therefor --83--.

Signed and Sealed this

Twenty-first Day of December 1976

[SEAL]

Attest:

RUTH C. MASON
Attesting Officer

C. MARSHALL DANN
Commissioner of Patents and Trademarks